(12) United States Patent
Chen et al.

(10) Patent No.: US 11,144,362 B1
(45) Date of Patent: Oct. 12, 2021

(54) CONTAINER SCHEDULING IN A CONTAINER ORCHESTRATION SYSTEM

(71) Applicant: INTERNATIONAL BUSINESS MACHINES CORPORATION, Armonk, NY (US)

(72) Inventors: Qin Yue Chen, Shanghai (CN); Han Su, Shanghai (CN); Feifei Li, Shanghai (CN); Chang Xin Miao, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/866,837

(22) Filed: May 5, 2020

(51) Int. Cl.
| | | |
|---|---|---|
| *G06F 15/16* | (2006.01) | |
| *G06F 9/54* | (2006.01) | |
| *H04L 29/06* | (2006.01) | |
| *G06F 9/50* | (2006.01) | |
| *G06F 12/1009* | (2016.01) | |

(52) U.S. Cl.
CPC .......... *G06F 9/5072* (2013.01); *G06F 9/5016* (2013.01); *G06F 9/5055* (2013.01); *G06F 9/5077* (2013.01); *G06F 12/1009* (2013.01)

(58) Field of Classification Search
CPC .................................................. G06F 9/5072
USPC ........................................................ 709/226
See application file for complete search history.

(56) References Cited

U.S. PATENT DOCUMENTS

| | | | | |
|---|---|---|---|---|
| 10,338,966 B2 * | 7/2019 | Chen | .................... | G06F 9/45558 |
| 10,884,816 B2 * | 1/2021 | Hu | ........................ | G06F 9/5016 |
| 10,944,691 B1 * | 3/2021 | Raut | ....................... | H04L 47/82 |
| 2017/0126506 A1 * | 5/2017 | Padala | ..................... | H04L 43/08 |
| 2018/0013636 A1 * | 1/2018 | Seetharamaiah | ..... | H04L 41/147 |
| 2018/0048545 A1 * | 2/2018 | Mishalov | ............ | G06F 11/3075 |
| 2018/0167487 A1 | 6/2018 | Vyas et al. | | |
| 2018/0276215 A1 | 9/2018 | Chiba et al. | | |
| 2018/0278639 A1 * | 9/2018 | Bernstein | .............. | G06F 21/577 |

(Continued)

FOREIGN PATENT DOCUMENTS

| | | |
|---|---|---|
| CN | 106027643 A | 10/2016 |
| CN | 106453492 A | 2/2017 |

(Continued)

OTHER PUBLICATIONS

C. Cérin, T. Menouer, W. Saad and W. B. Abdallah, "A New Docker Swarm Scheduling Strategy," 2017 IEEE 7th International Symposium on Cloud and Service Computing (SC2), 2017, pp. 112-117, doi: 10.1109/SC2.2017.24 (Year: 2017).*

(Continued)

*Primary Examiner* — Hamza N Algibhah
(74) *Attorney, Agent, or Firm* — Teddi E. Maranzano (57) ABSTRACT

Embodiments of the present disclosure relate to a computer-implemented method for container scheduling in a container orchestration system (COS). According to the method, a new unit comprising one or more containers are detected. Available memory for each of a plurality of candidate nodes deployed in the COS is predicted based on page sharing information of each candidate node. The plurality of candidate nodes filtered to obtain a set of filtered nodes are, wherein the available memory of each of the set of filtered node meets a memory size limitation of the new unit. Priorities of the set of filtered nodes are ranked according to one or more priority functions. The new unit is deployed to one of the filtered nodes based on the priorities.

20 Claims, 5 Drawing Sheets

(56) References Cited

U.S. PATENT DOCUMENTS

| | | | |
|---|---|---|---|
| 2019/0028490 A1* | 1/2019 | Chen | G06F 9/45558 |
| 2019/0102157 A1* | 4/2019 | Caldato | G06F 9/5083 |
| 2019/0102226 A1 | 4/2019 | Caldato et al. | |
| 2019/0132203 A1* | 5/2019 | Wince | G06F 16/215 |
| 2019/0273683 A1* | 9/2019 | Jiang | H04L 61/2007 |
| 2019/0391844 A1* | 12/2019 | Chen | G06F 9/5072 |
| 2020/0174671 A1* | 6/2020 | Margaglia | G06F 11/1076 |
| 2020/0218798 A1* | 7/2020 | Kosaka | G06F 9/455 |
| 2020/0341794 A1* | 10/2020 | Martin | H04L 43/065 |
| 2021/0034423 A1* | 2/2021 | Hallur | G06F 9/5016 |
| 2021/0042151 A1* | 2/2021 | Muller | G06F 9/5088 |
| 2021/0081292 A1* | 3/2021 | Jmt | G06F 3/0631 |
| 2021/0117217 A1* | 4/2021 | Croteau | G06F 9/5077 |
| 2021/0141655 A1* | 5/2021 | Gamage | G06F 9/45558 |
| 2021/0149737 A1* | 5/2021 | An | G06F 9/5072 |

FOREIGN PATENT DOCUMENTS

| | | |
|---|---|---|
| CN | 108228347 A | 6/2018 |
| WO | 2017084276 A1 | 5/2017 |

OTHER PUBLICATIONS

Stratus: cost-aware container scheduling in the public cloud, Authors: Andrew Chung, Jun Woo Park, Gregory R. Ganger, SoCC '18 : Proceedings of the ACM Symposium on Cloud ComputingOct. 2018 pp. 121-134 https://doi.org/10.1145/3267809.3267819 (Year: 2018).*

C. Kaewkasi and K. Chuenmuneewong, "Improvement of container scheduling for Docker using Ant Colony Optimization," 2017 9th International Conference on Knowledge and Smart Technology (KST), 2017, pp. 254-259, doi: 10.1109/KST.2017.7886112. (Year: 2017).*

Mell et al., "The NIST Definition of Cloud Computing", Recommendations of the National Institute of Standards and Technology, NIST Special Publication 800-145, Sep. 2011, 7 pages.

Kubernetes, "Assigning Pods to Nodes", printed on Mar. 5, 2020, 9 pages, https://kubernetes.io/docs/concepts/contiguration/assign-pod-node/.

Chunikhin, "Implementing Advanced Scheduling Techniques with Kubernetes", Kublr.com, Apr. 18, 2018, 13 pages.

Funston et al., "Placement of Virtual Containers on NUMA systems: A Practical and Comprehensive Model", This paper is included in the Proceedings of the 2018 USENIX Annual Technical Conference (USENIX ATC '18), Jul. 11-13, 2018, 14 pages.

IBM, "Designing images for sharing", IBM Linux, printed on Mar. 5, 2020, 3 pages.

Liu et al., "A new container scheduling algorithm based on multi-objective optimization", Soft Computing, (2018), vol. 22, pp. 7741-7752.

Wikipedia, "Page cache", printed on Mar. 5, 2020, 3 pages.

Santos et al., "Towards Network-Aware Resource Provisioning in Kubernetes for Fog Computing Applications", 2019 IEEE Conference on Network Softwarization (NetSoft), pp. 351-359.

Zhang et al., "Research on Kubernetes' Resource Scheduling Scheme", 2018 Association for Computing Machinery, Nov. 2-4, 2018, pp. 144-148.

* cited by examiner

CONTAINER SCHEDULING IN A CONTAINER ORCHESTRATION SYSTEM

BACKGROUND

The present invention relates to an orchestration system, and more specifically, to methods, systems and computer program products for container scheduling in a container orchestration system (COS).

A container orchestration system is used to provide, manage and scale containerized applications. Enterprises can use the container orchestration system (such as Kubernetes and Docker Swarm) to manage lifecycles of containerized applications in a cluster of nodes, which is a collection of worker machines such as virtual machines (VMs) or physical machines. A scheduler in the container orchestration system is responsible for scheduling a plurality of containers in a cluster of nodes.

SUMMARY

Embodiments of the present invention disclose methods, systems and computer program products for container scheduling in a container orchestration system (COS). According to the method, a new unit comprising one or more containers are detected. Available memory for each of a plurality of candidate nodes deployed in the COS is predicted based on page sharing information of each candidate node. The plurality of candidate nodes are filtered to obtain a set of filtered nodes, wherein the available memory of each of the set of filtered node meets a memory size limitation of the new unit. Priorities of the set of filtered nodes are ranked according to one or more priority functions. The new unit is deployed to one of the filtered nodes with the highest priority.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
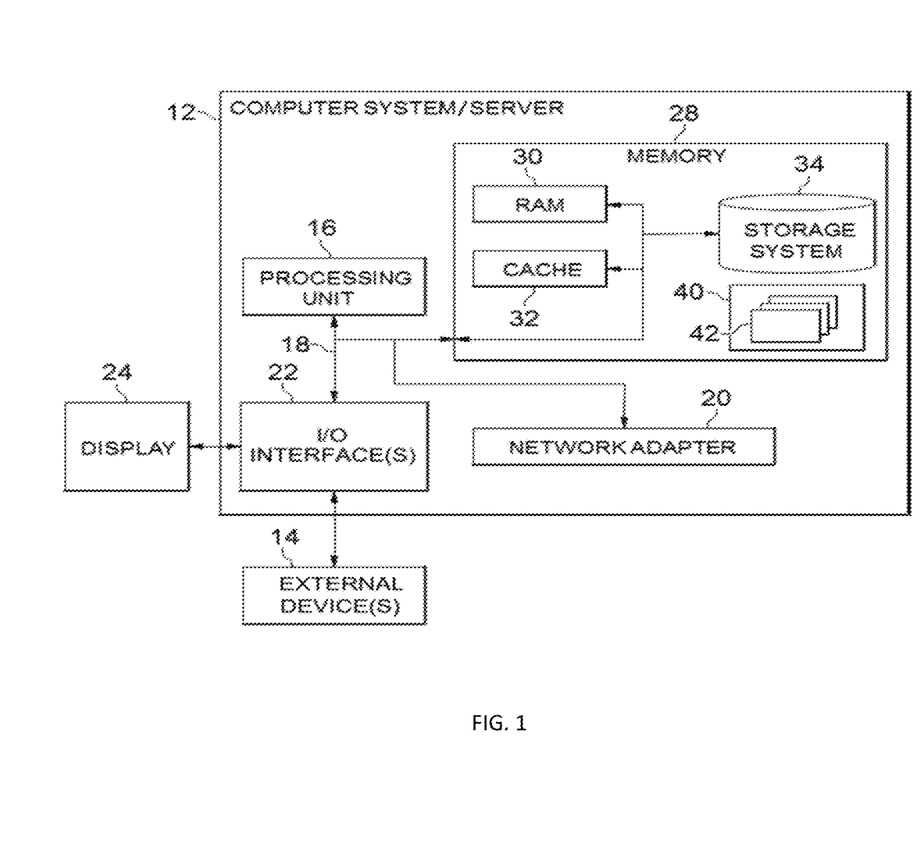
FIG. 1 depicts a cloud computing node according to an embodiment of the present disclosure.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
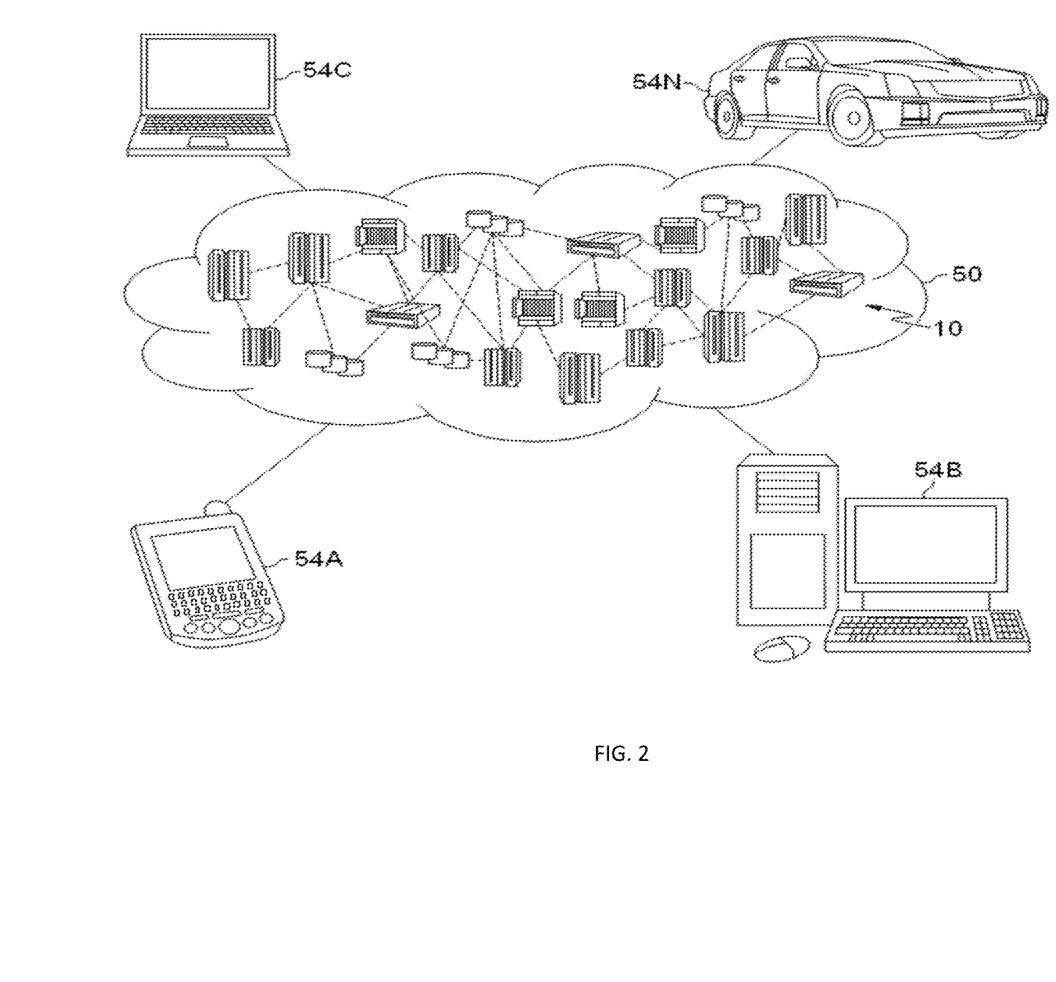
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
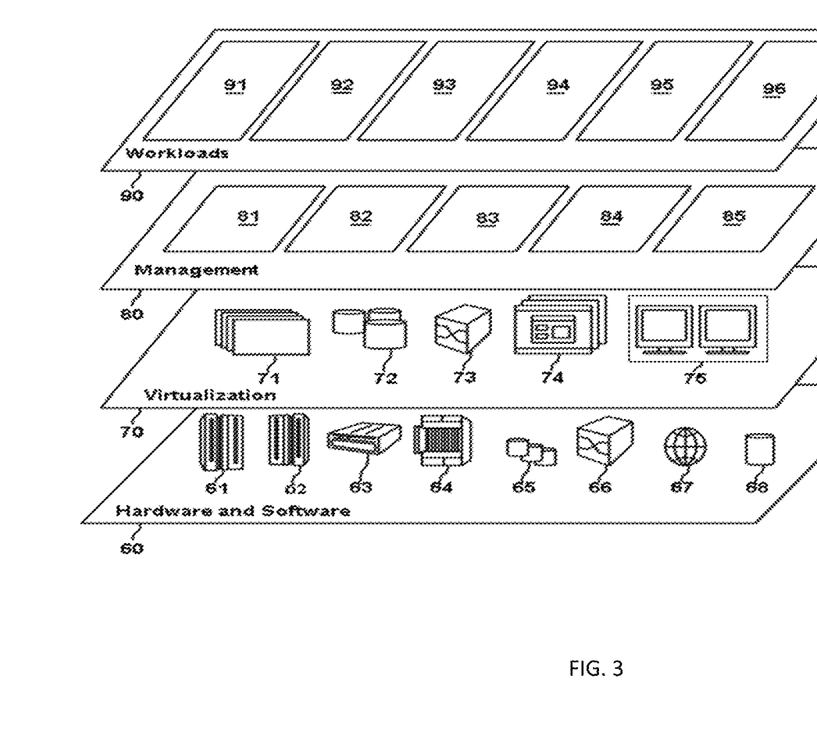
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and container scheduling 96.

Figure 4:
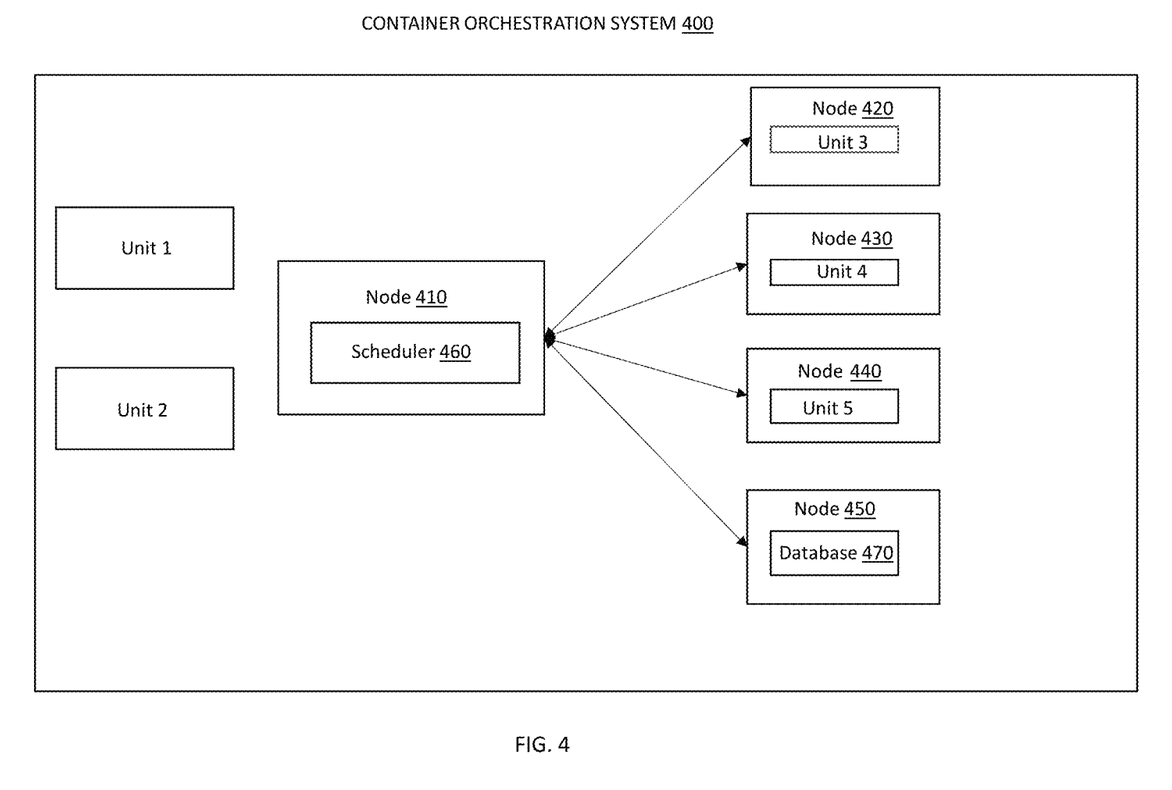
FIG. 4 depicts a container orchestration system according to an embodiment of the present disclosure.

With reference now to FIG. 4, container orchestration system (COS) 400 according to an embodiment of the present disclosure is depicted. COS 400 may include a cluster of nodes 410, 420, 430, 440 and 450. Scheduler 460 may reside on a master node 410 for scheduling a plurality of newly created units 1, 2, 3, 4 and 5 to nodes 420, 430 and 440. A unit (1, 2, 3, 4 or 5) herein is an abstract collection that represents a group of one or more containers, such as a Pod in Kubernetes, etc. The unit (1, 2, 3, 4 or 5) is a smallest unit that scheduler 460 can schedule to nodes 420, 430 and 440. Node 450 includes database 470 which is used to store information required by scheduler 460 during scheduling units. Scheduler 460 detects for newly created units that have not been scheduled to any node. Upon detecting a newly created unit, scheduler 460 is responsible for finding a node on which the newly created unit can run through prediction and ranking.

In prediction, according to a plurality of prediction policies, scheduler 460 can traverse all candidate nodes to filter out a set of filtered nodes which are feasible to schedule the newly created unit. Those candidate nodes which do not meet conditions of the plurality of predicting policies (for example, a candidate node without sufficient resources to run the newly created unit) are excluded from the set of filtered nodes. The plurality of prediction policies include, but are not limited to:

Resource prediction: evaluate if a candidate node has free resources (e.g., CPU and Memory) to meet resource requirement of the newly created unit.

Hostport prediction: evaluate if a candidate node has free ports (network protocols) for the ports requested by the newly created unit.

Network resource prediction: evaluate if a candidate node has sufficient network resources to meet network resource requirement of the newly created unit.

Volume prediction: evaluate if the volumes requested by the newly created unit are available on a candidate node.

Toleration prediction: evaluate if tolerations of the newly created unit can tolerate taints of a candidate node.

Memory pressure prediction: if a candidate node is reporting memory pressure, and there's no configured exception, the newly created unit will not be scheduled to the candidate node.

Storage pressure prediction: if a candidate node is reporting storage pressure, and there's no configured exception, the newly created unit will not be scheduled to the candidate node.

In ranking, the scheduler 460 uses a set of priority functions to process each of the set of filtered nodes. Each priority function returns a score (or ranking, etc.) for one of the set of filtered nodes. The set of priority functions can be assigned with respective weights. The weights can be set according to specific application scenario. The final score of each filtered node is the weighted sum of all the priority functions for the filtered node. Finally, scheduler 460 can assign the newly created unit to a filtered node with the highest ranking. A final score for each filtered node can be represented using Formula 1 as below.

$$FinalScoreNode = (w_1 * priorityFunc_1) + (w_2 * priorityFunc_2) + \ldots + (w_n * priorityFunc_n).$$

The FinalScoreNode indicates the final score of a filtered node, $w_1, w_2 \ldots w_n$ indicate a plurality of weights assigned to respective priority functions, and priorityFunc$_1$, priorityFunc$_2$, ..., priorityFunc$_n$ are scores returned by the respective priority functions for the filtered node.

During the resource prediction of the filtering, the scheduler 460 checks if a candidate node has available resources to meet the requirement of the newly created unit. This allows for maximized usage of the available memory of a candidate node during scheduling the newly created unit in COS. Formula 2, following, can be used to predict static available memory size of a candidate node.

$$\text{Memory\_Size}(A) = \text{Memory\_Size}(N) - \text{Memory\_Size}(L),$$

wherein Memory_Size(A) indicates an available memory size of the candidate node, Memory_Size(N) indicates a total memory size of the candidate node, Memory_Size(L) indicates a memory size limitation of all units deployed in the candidate node.

Content-based page sharing (CBPS) technology is commonly applied to multi-container environments. CBPS technology can make duplicated blocks of memory (or pages) to be collapsed into a single physical copy. Therefore, all duplicate virtual pages may point to a single physical page so as to reduce utilized memory space. In this situation, the static available memory size predicted as above is not correct to reflect actual available memory size of a candidate node. Therefore, there is a need to predict dynamic available memory during scheduling the newly created unit in COS.

Embodiments of the present disclosure provide an improved method to maximize usage of the available memory of a candidate node during scheduling a unit in COS. The embodiments of the present disclosure can implement prediction of dynamic available memory size of a candidate node by considering memory sharing among a plurality of containers running on the candidate node.

Figure 5:
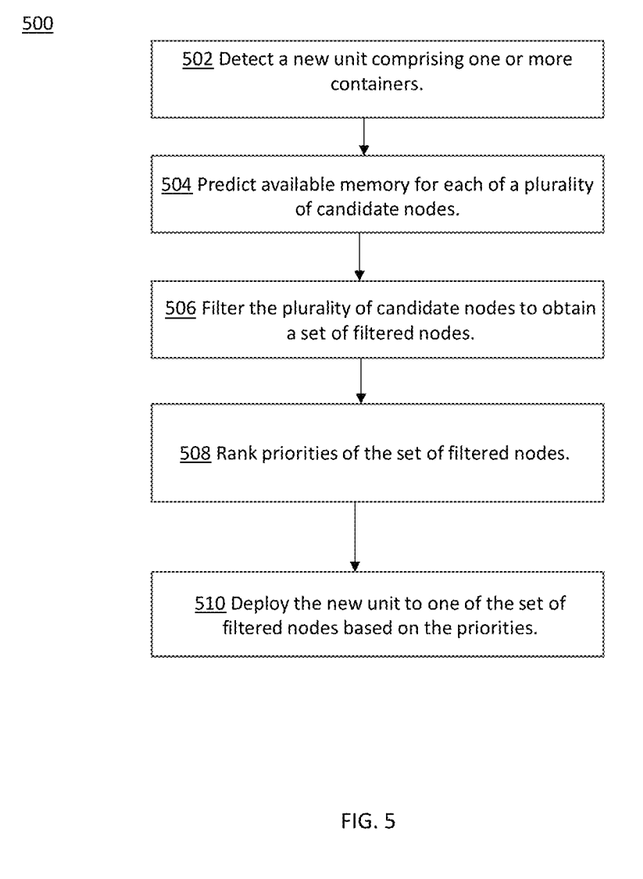
FIG. 5 depicts an example method for container scheduling in a container orchestration system according to an embodiment of the present disclosure.

To maximize usage of the available memory of a candidate node, the embodiments of the present disclosure provide an improved method to predict dynamic available memory size during scheduling a unit in COS 400. FIG. 5 describes an example computer-implemented method 500 for container scheduling in a container orchestration system (COS). The method 500 can be implemented by scheduler 460. The method 500 comprises steps 502-506.

At 502, a new unit comprising one or more containers is detected by the scheduler 460. The new unit is newly created and has not been scheduled to any node. Upon detecting the new unit, the scheduler 460 is responsible for finding a node on which the new unit can run.

At 504, available memory for each of a plurality of candidate nodes deployed in the COS is predicted based on page sharing information of each candidate node. The available memory for each candidate node is predicted using Formula 3 as below.

$$\text{Memory\_Size}(A) = \text{Memory\_Size}(N) - \text{Memory\_Size}(L) + \text{Memory\_Size}(S),$$

wherein Memory_Size(A) is an available memory size of each candidate node, Memory_Size(N) is a total memory size of each candidate node, Memory_Size(L) is a memory size limitation of all units deployed in each candidate node, and Memory_Size(S) is a saved memory size for each candidate node.

As described above, existing methods to predict Memory_Size(A) do not consider memory page sharing among a plurality of containers running on a node. With CBPS technology, COS 400 can implement page sharing among a plurality of containers running on a candidate node. Therefore, additional memory resources Memory_Size(S) can be saved for deploying new units. There are many existing implementations of CBPS, such as Kernel Same page Merging (KSM) and Transparent Page Sharing (TPS), etc. The embodiments of the present disclosure do not intend to suggest any limitation as to the implementations of CBPS. Those skilled in the art may appreciate, any existing and future implementation of CBPS can be applied to COS 400.

In embodiments of the present disclosure, each candidate node deployed in COS 400 can record its page sharing information which includes page indexes, reference numbers, and page sizes of one or more pages corresponding to each candidate node. The page index is a starting physical address of a page in a memory space which is assigned to each candidate node. Those skilled in the art may understand that the page index can be used to address the page in the memory. The page index and the page size are known to each candidate node. The reference number indicates the number of times a page is referenced, i.e., how many times the page is initially allocated to at least one container on a node. The page size indicates a size of a page. The page sharing information can be stored into database 470 in node 450. According to embodiments of the present disclosure, the page sharing information stored in database 470 can be updated periodically.

In embodiments of the present disclosure, page sharing information of each candidate node can include a plurality of entries. Each of the plurality of entries corresponds to a page of a memory space which is assigned to each candidate node, including a page index, a reference number, a page size and a saved memory size. The saved memory size indicates the volume of memory which can be saved for a page by applying container page sharing mechanism. When a container running on a node is initially allocated with a virtual memory address, a corresponding memory allocation event can be generated, which can be monitored by a monitoring thread or process running on the node. The monitoring thread or process can be implemented by a hooking method. The hooking method can acquire the virtual memory address when the memory allocation event occurs in a container. Then the virtual memory address can be mapped into a physical address which is the starting physical address of a page in the memory. It is indicated that the page is referenced one time. Under the CBPS mechanism, a page can be referenced many times as the page can be initially allocated to many different containers. If a page is referenced over two times, it indicates that the page has started paged sharing. For example, if a page is referenced three times, two-page memory size can be saved. The saved memory of a page can be calculated using Formula 4 as below.

$$\text{The saved memory of a page} = \text{Page\_size} * (\text{Reference\_number} - 1).$$

Page_size indicates a size of a page, Reference_number indicates the number of times a page is referenced.

In embodiments of the present disclosure, page sharing information of each candidate node may be recorded in the form of a table, such as Table 1. For example, Table 1 records the page sharing information of node 420 which includes a plurality of entries. Each of the plurality of entries includes a page index, a reference number, a page size and a saved memory size. Page indexes of all entries correspond to a physical memory space ranged from 0x01001000 to 0x3fffffff. The page size of each page is 4 KB. When a container running on node 420 is initially allocated a virtual memory address, node 420 can acquire the virtual memory address and map the virtual memory address into a physical address. Then node 420 searches the physical address in Table 1. After retrieving an entry with the physical address in Table 1, the reference number of the entry is increased by 1. The saved memory of the entry can be calculated using formula 4. By way of example, for the first entry with page index "0x01001000", Reference number "2" indicates that this page has been shared one time and one-page size (4 KB) is saved. For the second entry with page index "0x01001001", Reference number "3" indicates that this page has been shared twice and two-page size (8 KB) is saved.

TABLE 1

| Page Index | Page size (KB) | Reference number | Saved memory size (KB) |
|---|---|---|---|
| 0x01001000 | 4 | 2 | 4 |
| 0x01001001 | 4 | 3 | 8 |
| 0x01001002 | 4 | 2 | 4 |
| 0x01001003 | 4 | 11 | 40 |
| ... | ... | ... | ... |
| 0x3fffffff | 4 | 2 | 4 |

Upon detecting a newly created unit, the scheduler 460 may acquire page sharing information of respective candidate nodes from node 450. By way of example, after acquiring a plurality of entries in Table 1, the scheduler 460 can get a totally saved memory size (4192 KB) for node 420 by accumulating saved memory for all the entries (4+8+4+40+ . . . 4). That is, Memory_Size(S) of node 420 is 4192 KB. Scheduler 460 can record Memory_Size(S) for each candidate node in the form of a table such as Table 2. With reference to Formula 3, as Memory_Size(S) is variable with time, Memory_Size(A) can reflect dynamic available memory size of each candidate node in real time.

TABLE 2

|  | Node 420 | Node 430 | Node 440 |
|---|---|---|---|
| Memory_Size(S) | 4192 KB | 4420 KB | 5760 KB |

At 506, the plurality of candidate nodes are filtered to obtain a set of filtered nodes, wherein the available memory of each of the set of filtered node meets a memory size limitation of the new unit.

According to embodiments of the present disclosure, for each of a plurality of candidate nodes, Memory_Size(A) is compared with Memory_Size(U), wherein Memory_Size(U) indicates a memory size limitation of the new unit. If Memory_Size(A) of a candidate node is greater than or equal to Memory_Size(U), it indicates that the candidate node has sufficient available memory to run the new unit. If Memory_Size(A) of a candidate node is less than Memory_Size(U), it indicates that the candidate node does not have sufficient available memory to run the new unit. By this way, the plurality of candidate nodes are filtered to obtain the set of filtered nodes.

In embodiments of the present disclosure, wherein one or more additional attributes of each of the set of filtered nodes further meet requirements of the new unit, and the one or more additional attributes include at least one of: available processing unit resources, available network resources, available host ports and available volumes.

At 508, priorities of the set of filtered nodes are ranked based on one or more priority functions. In embodiments of the present disclosure, scores of the set of filtered nodes are computed according to one or more priority functions. The priorities of the set of filtered nodes are ranked based on the scores.

According to embodiments of the present disclosure, the one or more priority functions include a memory priority function. The memory priority function can be represented as a shared memory ratio of Memory_Size(P) to Memory_Size(R), wherein Memory_Size(P) indicates a potential page sharing size between the new unit and a filtered nodes, Memory_Size(R) indicates a required memory size if the new unit runs on the filtered node. However, during the scheduling phase, the scheduler 460 does not acquire Memory_Size(P) and Memory_Size(R). According to embodiments of the present disclosure, an approximate computing is conceived to approach the ratio of Memory_Size(P) to Memory_Size(U). The approximate computing can be expressed as a ratio of Image_Layer_Size of (S1∩S2) to Image_Layer_Size of S1. According to embodiments of the present disclosure, the memory priority of the set of filtered nodes can be scored from 0-10 using Formula 5 below.

Node_Score=(Image_Layer_Size of ($S1 \cap S2$)/Image_Layer_Size of $S1$)*10.

S1 indicates all image layers of the new units, S2 indicates all image layers of a filtered nodes, and S1∩S2 indicates a intersection of S1 and S2.

According to embodiments of the present disclosure, a container is created from its image. An image may include one or more layers, which are stacked on each other. Each layer has its size and identifier (ID). An image layer ID can uniquely identify a layer of the image. For each node, all image layers' IDs and sizes can be maintained in database 470 in the form of table such as Table 3.

TABLE 3

| Image layer IDs | Size (KB) | Node |
|---|---|---|
| 91e54dfb | 20 | Node 420 |
| D74508eb | 200 |  |
| C2293c84 | 190 |  |
| B83a1f33a | 250 |  |
| 4533Badc | 40 | Node 430 |
| F74923d2 | 130 |  |
| H47589g | 200 |  |
| S2483jk4 | 230 |  |
| B83a1f33a | 320 |  |
| 91e54dfb | 20 | Node 440 |
| D74508eb | 120 |  |
| C375847d | 210 |  |
| A34738df | 300 |  |

According to embodiments of the present disclosure, upon acquiring IDs and sizes of all image layers of the new unit, scheduler 460 can compare each image layer ID of the new unit with that of each filtered node. If the comparing result indicates that an image layer ID of the new unit and an image layer ID of a filtered node are the same, it indicates that the new unit and the filtered node have a same image layer. That means the new unit and the filtered node can share the same image layer. According to an embodiment, scheduler 460 acquires IDs and sizes of all the image layers of the new unit (such as, example new unit 1) from a table stored in database 470, such as the following Table 4.

TABLE 4

| Image layer IDs | Size (KB) | New unit |
|---|---|---|
| 91e54dfb | 20 | Example new unit 1 |
| F74923d2 | 130 | |
| C375847d | 210 | |
| A34738df | 300 | |

By way of example, it is assumed that nodes 420, 430 and 440 are all filtered nodes. After comparing each image layer ID of the new unit with that of each filtered node, it is found that, there is a same image layer whose ID is 91e54dfb between the new unit and node 420, there is a same image layer whose ID is F74923d2 between the new unit and node 430, and there are two image layers whose ID are C375847d and A34738df between the new unit and node 440. Then scores of nodes 420, 430 and 440 can be computed according to Formula 5 as below.

$$\text{Node\_Score of node } 420=20/(20+130+210+300)*10=0.5$$

$$\text{Node\_Score of node } 430=130/(20+130+210+300)*10=1.96$$

$$\text{Node\_Score of node } 440=510/(20+130+210+300)*10=7.72$$

Therefore, it can be determined that node 440 ranks the first priority based on the scores. As Formula 1 shows, the final score of each filtered node is decided by one or more priority functions and their weights. Those skilled in the art may understand that, embodiments of present disclosure only relate to an improvement on the memory priority function considering memory page sharing among a plurality of containers running on a node, which do not have any influence on other priority functions. Combining with embodiments of the present disclosure, any existing or future emerging priority functions can be applied to Formula 1. Finally, the final score of each filtered node can come out according to Formula 1. At 510, the new unit is deployed to one of the set of filtered nodes based on the priorities. For example, the new unit is deployed to one of the set of filtered nodes with the highest priority.

It should be noted that the processing of an application building in a distributed computing environment according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for container scheduling in a container orchestration system (COS) comprising:
    detecting, by one or more processing units, a new unit comprising one or more containers;
    predicting, by the one or more processing units, available memory for each of a plurality of candidate nodes deployed in the COS based on page sharing information of each candidate node;
    filtering, by the one or more processing units, the plurality of candidate nodes to obtain a set of filtered nodes, wherein the available memory of each of the set of filtered node meets a memory size limitation of the new unit;
    ranking, by the one or more processing units, priorities of the set of filtered nodes according to one or more priority functions; and
    deploying, by the one or more processing units, the new unit to one of the filtered nodes based on the priorities.

2. The method of claim 1, wherein the page sharing information of each candidate node includes page indexes, reference numbers, and page sizes of one or more pages corresponding to each candidate node.

3. The method of claim 1, wherein one or more additional attributes of each of the set of filtered nodes further meet requirements of the new unit, and the one or more additional attributes include at least one of: available processing unit resources, available network resources, available host ports and available volumes.

4. The method of claim 1, wherein the available memory of each candidate node is predicted as Memory_Size(N)−Memory_Size(L)+Memory_Size(S), wherein Memory_Size(N) is a total memory size of each candidate node, Memory_Size(L) is a memory size limitation of all units deployed in each candidate node, and Memory_Size(S) is a saved memory size for each candidate node.

5. The method of claim 4, wherein the saved memory size for each candidate node is acquired by accumulating saved memory sizes for all pages corresponding to each candidate node, wherein a saved memory size for a page is calculated as Page_size*(Reference_number−1), wherein Page_size is the size of the page, and Reference_number is a number of times the page is referenced.

6. The method of claim 4, wherein the filtering the plurality of candidate nodes comprises:
    for each of the plurality of candidate nodes,
    comparing, by one or more processing units, the available memory of a candidate node with the memory size limitation of the new unit;
    in response to the available memory of the candidate node being greater than or equal to the memory limitation, grouping, by one or more processing units, the candidate node into the set of filtered nodes.

7. The method of claim 1, wherein the ranking the priorities of the set of filtered nodes comprises:
    computing, by the one or more processing units, scores of the set of filtered nodes according to the one or more priority functions; and
    ranking, by the one or more processing units, the priorities of the set of filtered nodes based on the scores.

8. The method of claim 1, wherein the one or more priority functions include a memory priority function, the memory priority function is represented as a ratio of Memory_Size(P) to Memory_Size(R), wherein Memory_Size(P) indicates a potential page sharing size between the new unit and a filtered node, and Memory_Size(R) indicates a required memory size if the new unit runs on the filtered node.

9. The method of claim 1, wherein the one or more priority functions include a memory priority function, and the memory priority function is represented as a ratio of a memory size of (S1∩S2) to a memory size of S1, wherein S1 indicates all image layers of the new unit, S2 indicates all image layers of a filtered node, and S1∩S2 indicates a intersection of S1 and S2.

10. A computer system for container scheduling in a container orchestration system (COS) comprising:
    one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
- detecting a new unit comprising one or more containers;
- predicting available memory for each of a plurality of candidate nodes deployed in the COS based on page sharing information of each candidate node;
- filtering the plurality of candidate nodes to obtain a set of filtered nodes, wherein the available memory of each of the set of filtered node meets a memory size limitation of the new unit;
- ranking priorities of the set of filtered nodes according to one or more priority functions; and
- deploying the new unit to one of the filtered nodes based on the priorities.

11. The computer system of claim 10, wherein the page sharing information of each candidate node includes page indexes, reference numbers, and page sizes of one or more pages corresponding to each candidate node.

12. The computer system of claim 10, wherein one or more additional attributes of each of the set of filtered nodes further meet requirements of the new unit, and the one or more additional attributes include at least one of: available processing unit resources, available network resources, available host ports and available volumes.

13. The computer system of claim 10, wherein the available memory of each candidate node is predicted as Memory_Size(N)−Memory_Size(L)+Memory_Size(S), wherein Memory_Size(N) is a total memory size of each candidate node, Memory_Size(L) is a memory size limitation of all units deployed in each candidate node, and Memory_Size(S) is a saved memory size for each candidate node.

14. The computer system of claim 12, wherein the saved memory size for each candidate node is acquired by accumulating saved memory sizes for all pages corresponding to each candidate node, wherein a saved memory size for a page is calculated as Page_size*(Reference_number−1), the wherein Page_size is the size of the page, and the Reference_number is a number of times the page is referenced.

15. The computer system of claim 13, wherein the filtering the plurality of candidate nodes comprises:
- for each of the plurality of candidate nodes,
- comparing the available memory of a candidate node with the memory size limitation of the new unit;
- in response to the available memory of the candidate node being greater than or equal to the memory size limitation, grouping the candidate node into the set of filtered nodes.

16. The computer system of claim 10, wherein the ranking the priorities of the set of filtered nodes comprises:
- computing scores of the set of filtered nodes according to the one or more priority functions; and
- ranking the priorities of the set of filtered nodes based on the scores.

17. The computer system of claim 10, wherein the one or more priority functions include a memory priority function, the memory priority function is represented as a ratio of Memory_Size(P) to Memory_Size(R), wherein Memory_Size(P) indicates a potential page sharing size between the new unit and a filtered node, and Memory_Size(R) indicates a required memory size if the new unit runs on the filtered node.

18. The computer system of claim 10, wherein the one or more priority functions include a memory priority function, and the memory priority function is represented as a ratio of a memory size of (S1∩S2) to a memory size of S1, wherein S1 indicates all image layers of the new unit, S2 indicates all image layers of a filtered node, and S1∩S2 indicates a intersection of S1 and S2.

19. A computer program product comprising one or more computer-readable storage media and program instructions stored on at least one of the one or more tangible storage media, the program instructions executable by a processor to cause the processor to perform a method comprising:
- detecting a new unit comprising one or more containers;
- predicting an available memory for each of a plurality of candidate nodes deployed in the COS based on page sharing information of each candidate node;
- filtering the plurality of candidate nodes to obtain a set of filtered nodes, wherein the available memory of each of the set of filtered node meets a memory size limitation of the new unit;
- ranking priorities of the set of filtered nodes according to one or more priority functions; and
- deploying the new unit to one of the filtered nodes based on the priorities.

20. The computer program product of claim 19, wherein the available memory of each candidate node is predicted as Memory_Size(N)−Memory_Size(L)+Memory_Size(S), wherein Memory_Size(N) is a total memory size of each candidate node, Memory_Size(L) is a memory size limitation of all units deployed in each candidate node, and Memory_Size(S) is a saved memory size for each candidate node.

* * * * *